United States Patent [19]
Londo et al.

[11] Patent Number: 5,997,625
[45] Date of Patent: Dec. 7, 1999

[54] COATING PIGMENT FOR INK-JET PRINTING

[75] Inventors: Michael G. Londo, Macon, Ga.; Ahmad Moini, Princeton, N.J.; Mitchell R. Gibbs, Gordon; Stephanie F. Greene, Allentown, both of Ga.

[73] Assignee: Engelhard Corporation, Iselin, N.J.

[21] Appl. No.: 09/071,509

[22] Filed: May 1, 1998

[51] Int. Cl.⁶ ............................................. C09C 1/28
[52] U.S. Cl. ...................... 106/486; 106/412; 106/468; 106/470
[58] Field of Search ................... 106/416, 468, 106/470, 486

[56] References Cited

U.S. PATENT DOCUMENTS

| | | | |
|---|---|---|---|
| 3,586,523 | 6/1971 | Fanselow et al. | 106/288 B |
| 4,446,174 | 5/1984 | Maekawa et al. | 427/261 |
| 4,792,487 | 12/1988 | Schubring et al. | 428/342 |
| 4,851,048 | 7/1989 | Jones et al. | 106/486 |
| 5,207,822 | 5/1983 | Manasso et al. | 106/416 |
| 5,320,897 | 6/1994 | Kondo et al. | 428/195 |
| 5,535,890 | 7/1996 | Behl et al. | 209/5 |
| 5,624,488 | 4/1997 | Forbus et al. | 106/484 |

FOREIGN PATENT DOCUMENTS

| | | |
|---|---|---|
| 35/5150395 | 11/1980 | Japan . |
| 98/36029 | 8/1998 | WIPO . |

*Primary Examiner*—Mark L. Bell
*Assistant Examiner*—David Sample

[57] ABSTRACT

A coating pigment composition comprising a hydrous clay, a caustic leached calcined clay, and a porous mineral provides a coating having excellent balance of color intensity and color definition characteristics when printed on by multicolored inks. The pigments of this invention offer a low cost alternative to conventional silica-based coatings in addition to affording other desirable benefits such as improved rheology, less required coat weights, and higher coating solids compared to conventional silica coatings.

20 Claims, 1 Drawing Sheet

COATING PIGMENT FOR INK-JET PRINTING

BACKGROUND OF THE INVENTION

1.1 Field of the Invention

The present invention is directed toward novel clay-based pigments. More particularly, the invention relates to a modified kaolin pigment useful in the coating of paper for ink-jet printing applications.

1.2 Related Art

It is known that surface characteristics of paper (or any other printing surface) play a large role in how ink will be received and appear after application to the printing surface. Thus, varying print appearances can be expected depending on whether the surface ink is being applied to is uncoated or coated. Printing on uncoated paper results in low quality printing while printing on coated paper results in a higher quality print albeit of varying quality according to the nature of the paper coating composition.

Two of the more important characteristics to be controlled in color ink jet printing are depth of penetration and feathering or bleeding of the ink when applied to the paper. Too deep of a penetration results in poor color intensity. Bleeding results in poor printing definition. A further criteria, not known to have been identified in the prior art of multicolor ink jet printing and as hereinafter disclosed, is to control the contact angle of the various ink jet colors (i.e., cyan, magenta, yellow, and black) in a manner that the inks will substantially have the same contact angle when applied to the coated paper. When the contact angles of the various inks are substantially the same, the appearance of the ink colors are more uniform, i.e., one color does not appear more dull or more bright than another color.

A common component of paper coating compositions of the prior art is silica. While silica is an effective paper coating constituent as a hydrophilic pigment, it is somewhat more expensive than clay-based pigments and has severe rheological limitations such as in the amount of coating solids and Brookfield viscosity.

Thus, there is a need in the art for less expensive pigments which do not sacrifice printing qualities and desirably improve rheological properties.

U.S. Pat. No. 4,446,174 is directed to a method of ink jet recording and identifies desirable properties of substrates or coatings for satisfactory color ink jet printing. This patent purports that maintaining an $R_f$ value (ratio of traveling distance of dye to that of the solvent in the aqueous ink) of less than 0.59 produces images of high quality having high ink absorption and image density.

U.S. Pat. No. 4,792,487 describes ink jet recording medium coatings containing a high swelling montmorillonite clay and silica.

However, these references do not disclose or suggest the claimed combination of components of the applicants' invention.

We have now found a kaolin-based pigment which is less expensive than silica and provides outstanding color intensity and resolution in addition to several other advantages hereinafter described.

SUMMARY OF THE INVENTION

The present invention relates to compositions and methods concerning clay-based pigments useful in paper coating applications, particularly in providing coatings for multicolor ink jet paper applications.

One embodiment of the invention relates to a coating pigment composition comprising:

(a) a hydrous clay;

(b) a caustic leached calcined clay; and (c) a porous mineral having a pore size of up to 100 Angstroms and a BET surface area in the range of 200 to 1000 $m^2/g$;

wherein (a), (b), and (c) are present in relative amounts such that said pigment composition present in a coating produces substantially equivalent ink contact angles when said coating receives more than one type of colored ink.

Advantages of the compositions of this invention include improved rheology and higher coating solids. This allows the high speed paper and coating machines to produce an ink-jet coated grade of paper not previously capable of being produced. The material described in this invention also offers a substantial reduction in cost over the silica pigment. Yet another unexpected result is that this pigment requires less coatweight and binder than the conventional silica coatings. Also, acceptable coatings can be made without the need for dispersants.

DETAILED DESCRIPTION OF PREFERRED EMBODIMENTS OF THE INVENTION

Figure 1:
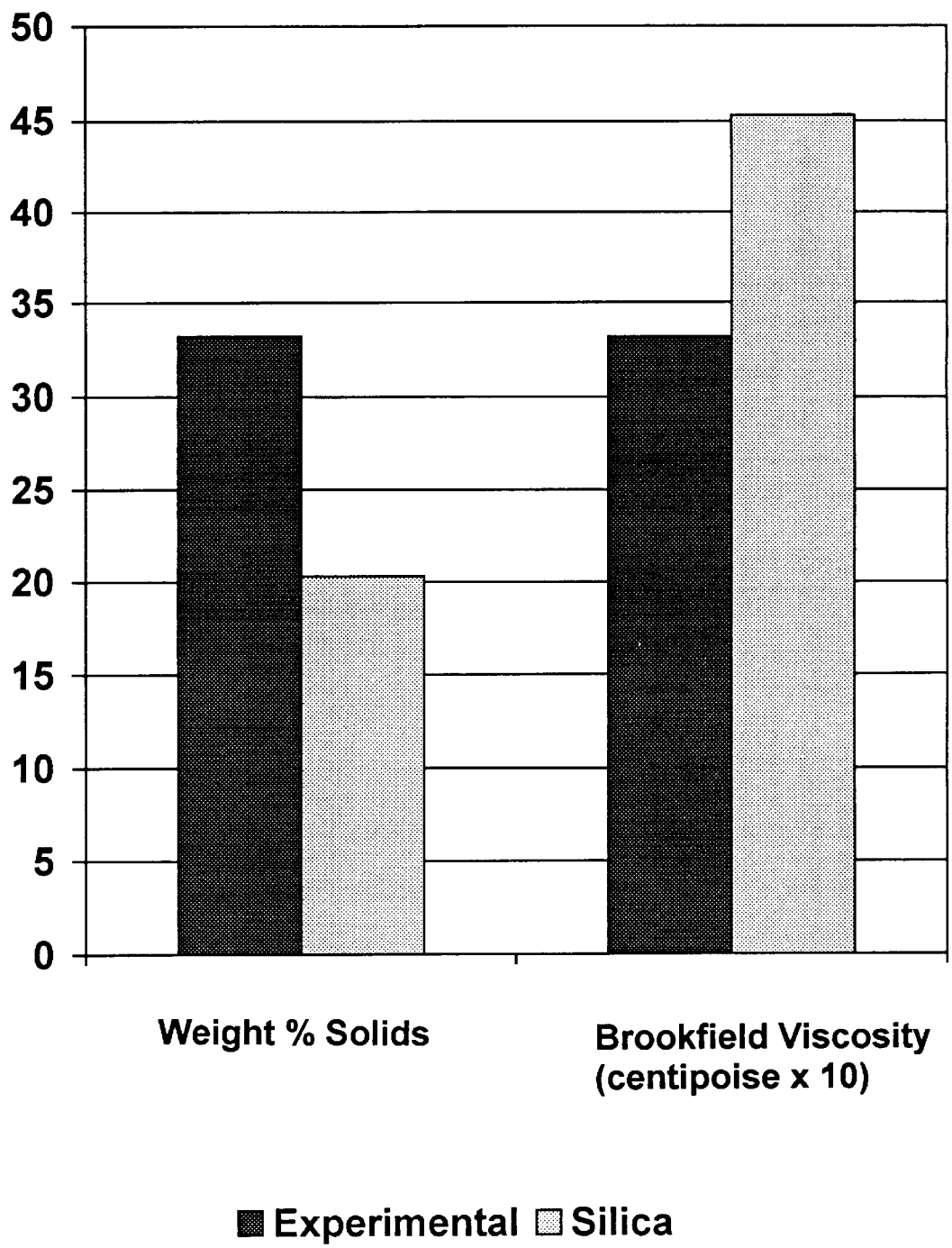
FIG. 1 is a graphical illustration of this invention's advantages in terms of percent coating solids and Brookfield viscosity compared with a conventional silica pigment.

The compositions and methods of this invention relate to novel and improved coating pigments. The present invention will become more apparent from the following definitions and accompanying discussion.

As used herein, the expression "substantially equivalent ink contact angle" is intended to define the contact angle of the various inks being within an acceptable deviation which provides the desired or acceptable print characteristics of color density and color definition. Typically, acceptable printing results are achieved when the contact angle is within ±10, more preferably ±5, most preferably ±3 degrees from the numeric average of the measured contact angles.

As used herein, all percentages are given on a weight basis unless otherwise indicated.

The Hydrous Clay

As used herein, the term "hydrous clay" is intended to describe a clay which has not been subjected to calcination, i.e., a temperature that would alter the basic crystalline structure of the clay. In the case of kaolin, subjection to temperatures under 450° C. will not alter the kaolin's crystalline structure.

Hydrous clays are widely known in the art and are typically produced from crude clays which have been subjected to beneficiation, as for example to, froth flotation, magnetic separation, mechanical delamination, grinding, or similar commutation. Useful hydrous clays typically will have particle sizes of about greater than 80% finer than 2 micrometers.

A preferred hydrous clay is derived from kaolinite. Kaolinite is an aluminum hydroxide silicate having the approximate composition of $Al_2(OH) \cdot 4Si_2O_5$.

It is known that the shape of the particle size distribution curve of the hydrous clay has an effect on the pigment' send-use application such as in coating. A clay having the following particle size distribution characteristics has been found to provide excellent rheology: a median particle size of 0.55 micrometers and a particle size distribution such that about 88+/−2% of the particles have an equivalent spherical diameter less than about 2 micrometers and not more than about 25% by weight, preferably not more than about 20% by weight, have an equivalent spherical diameter less than 0.3 micrometers. If the quantity of ultrafine particles, i.e., particles 0.3 micrometers and finer, is too great, the rheology of the pigment may be such that it has limited, if any, use.

In order to achieve the desired particle size distribution of the hydrous clay, it is generally necessary to perform one or more particle size separations on the crude clay. Generally, such processing includes degritting, followed by differential gravitational or centrifugal sedimentation to recover a size fraction of desired particle size, such as for example, a fraction that is 90% by weight finer than 2 micrometers and does not contain an excessive amount of ultrafine particles. The content of ultrafines and median (weight) particle size of such fraction will vary, depending on the particle size distribution of the crude clay. In order to perform these operations successfully, it is essential that the clay be present in the form of discrete particles in water rather than flocs so that the particles can be accurately separated into different size ranges. The clay particles are therefore treated with a deflocculant (dispersing agent) which will give all the particles a negative electric charge, and cause them to repel each other when the particles are suspended in water. The clay dispersant used at this stage is generally referred to as a "primary" dispersant. Dispersants used to deflocculate suspensions of previously processed clay (such as dispersants added to filter cakes) are termed "secondary" dispersants or deflocculants. Suitable dispersing agents used for primary dispersion in practice of the present invention are conventional and include water soluble salts of a condensed phosphate, such as a pyrophosphate, e.g., tetrasodium pyrophosphate, (TSPP), a water soluble salt of a polysilicic acid, for example, sodium silicate, or a water soluble organic polymeric dispersing agent, for example a polyacrylate or a polymethacrylate salt having a molecular weight in the range of about 500 to about 10,000. The amount of dispersing agent used will generally be in the range of from about 0.025 to 0.2% by weight based on the weight of the dry clay. Generally, particle size separations are performed using deflocculatd aqueous suspensions having a solids content of about 20–40% by weight. Other solids levels may be used to carry out such separations. The median particle size of the clay particles should range from 0.4 to 0.7 micrometers, equivalent spherical diameter (e.s.d.), preferably 0.5 to 0.6 micrometers, as determined by conventional sedimentation techniques using the SEDIGRAPH® particle size analyzer, supplied by Micromeretics, Inc. From about 80% to 95% by weight of the particles should be finer than 2 micrometers, e.s.d. The content of fines below 0.3 micrometer e.s.d. should be below 35 weight percent, preferably below 25 weight percent, and most preferably 20 weight percent or below. It should be understood that the measurements of the size of clay particles that are 0.3 micrometer or finer are of limited reproducibility. Thus, when a SEDIGRAPH® analyzer is employed, the value for weight percent may be +/−5% when tested by another operator or a different SEDIGRAPH® analyzer is employed. Most preferably, median particle size is 0.6+/−0.05 micrometers, e.s.d., with 85 to 90% by weight of the particles finer than 2 micrometers, e.s.d., and less than about 20% by weight or less finer than 0.30 micrometers, e.s.d. Blending of clay fractions may be advantageous or necessary with some crudes to provide a clay feed having a desirable particle size distribution.

A particularly preferred hydrous clay described in commonly assigned U.S. Pat. No. 5,535,890 ('890 patent), the disclosure of which is incorporated by reference. Characteristic of the beneficiated hydrous clays is the ultrafine particle size distribution resulting from the described treatment of typical East Georgia crude clays. The particle size typical of these crude clays varies from 80 percent (by weight) finer than 2 micrometers to in excess of 95 percent finer than 2 micrometers based on equivalent spherical diameter (e.s.d.). At least 50 percent by weight is generally finer than 0.4 micrometer. Thus, these clays fall within a common definition of slimed ores, as used in froth flotation technology.

The beneficiated hydrous clay particularly preferred in this invention is made according to the procedure of Example 1 of the '890 patent. The particle size distribution of the beneficiated clay preferably ranges from 90 percent finer than 2.0 micrometer with approximately 50–55 percent of the particles averaging 0.2 micron; more preferably 98 percent finer than 2.0 micrometer with approximately 65–70 percent of the particles averaging 0.2 micron.

The Leached Calcined Clay

A fuller description of the leached calcined clay may be found in commonly assigned, co-pending patent application, U.S. Ser. No. 09/071,626 filed May 1, 1998 the disclosure of which is incorporated by reference and briefly described below.

As used herein the term "calcined" is intended to refer to heating of clay to a temperature and for a time sufficient to destroy the crystalline structure of the clay. In the case of kaolinite, temperatures above 450° C. and for a time period which eliminates the hydroxyl groups will result in "fully calcined" product. At a temperature of about 1000° C., kaolinite will be fully calcined in about 1 hour. It is not desirable to heat the clay at temperatures near or above 1200° C. because severely abrasive mullite is formed which is also more difficult to leach. Also, it is difficult to leach a clay that has not been fully-calcined.

An example of a suitable fully-calcined clay is sold by Engelhard Corporation under the trademark Ansilex® 93. This calcined product is well documented in the patent literature, notably in U.S. Pat. Nos. 3,586,523 and 5,624,488, the disclosures of which are incorporated by reference.

Characteristic of the Ansilex® 93 pigment is its higher GE brightness of 92–95 and relatively low Einlehner abrasion value of about 20 mg (i.e., low relative to other calcined kaolin clay pigments but not low compared to available non-calcined kaolin pigments). Other physical characteristic of Ansilex® 93 are particle size distribution of 86 to 90 percent finer than 2.0 micrometer, median particle size of approximately 50 percent in the range of 0.6 to 0.8 micrometer.

In forming the caustic leached calcined clay suitable for use in this invention, the degree of leaching must not go beyond removal of more than about 40 percent by weight of the silica from the calcined clay. At silica removal amounts above 40 percent by weight, the opacity of the leached clay is adversely lowered.

Leaching time is dependent on several factors including:
(1) the quantity of free silica to be removed;
(2) the porosity of the clay before leaching;
(3) the concentration and type of leaching solution used;
(4) the temperature of leaching; and
(5) weight percent solids of the clay in the leaching solution.

Leaching with a 15 percent NaOH solution added at 15 percent by weight to the fully-calcined clay (dry basis) at 60° C. for one hour was sufficient to leach out 20 percent by weight of the silica from the calcined clay.

The Porous Mineral

The porous minerals useful in this invention are characterized in having pore sizes up to 100 Angstroms, preferably less than 40 Angstroms, most preferably less than 10 Angstroms and a BET surface area in the range of 200 to 1000 m$^2$/g, preferably between 200 and 800 m$^2$/g, most preferably between 400 and 800 m$^2$/g. Desirably the porous minerals are uniformly porous.

Examples of such minerals, whether naturally occurring or synthetically manufactured, include zeolites, porous silica (including fumed, precipitated, aerogels, or hydrogels), alumina, calcium carbonate, montmorillonite (e.g., bentonite or hectorite), attapulgite, halloysite, vermiculite, diatomaceous earth, silicic anhydride, talc, aluminum silicate, calcium silicate magnesium silicate, barium sulfate, calcium sulfate, zinc oxide, and zirconia salt. Most preferred are zeolites.

Suitable natural zeolites include mordenite, clinoptilolite, ferrierite, dachiardite, chabazite, erionite, and faujasite.

Suitable synthetic zeolites include, but are not limited to, the synthetic faujasite crystal types, i.e. zeolites X and Y, as well as zeolites A, L, P, Beta, synthetic mordenite and ferrierite, ZSM-5, and MCM-22. Larger pore mesoporous silicates, such as MCM-41 and related phases, as well as other families of molecular sieves, such as aluminophosphates and titanosilicates, are also suitable phases. A particularly preferred zeolite is any member of the faujasite family. It is to be understood that these zeolites may include demetallated zeolites which are understood to include significant pore volume in the mesoporous range, i.e. 20 to 500 Angstroms.

Usually synthetic zeolites are prepared in the sodium form, that is, with a sodium cation in close proximity to each aluminum tetrahedron and balancing its charge. A number of principal types of zeolites have been reported. These zeolite types vary both in their crystallographic structure as well as composition. Depending on their crystal structures, zeolites have different pore sizes. These zeolitic pores, which are present uniformly throughout the structure, should be distinguished from other non-zeolitic macropores that may be present in certain particles. Examples of approximate pore diameters include chabazite (3.8 Å), zeolite A (4.1 Å), ZSM-5 (5.1–5.6 Å), and zeolite Y (7.4 Å).

The composition of the zeolites may vary depending on the number of tetrahedral sites that are occupied by aluminum versus silicon. This composition is usually expressed in terms of a SiO$_2$/Al$_2$O$_3$ ratio. For example, zeolites X and Y are both synthetic analogs of the mineral faujasite, but with different composition ranges as shown below:

| Zeolite X | SiO$_2$/Al$_2$O$_3$ = 2.0–3.0 |
|---|---|
| Zeolite Y | SiO$_2$/Al$_2$O$_3$ = 3.0–6.0. |

Other zeolites, such as ZSM-5, have much higher SiO$_2$/Al$_2$O$_3$ ratios.

A preferred zeolite is the synthetic Y type zeolite having a faujasite structure. Y type zeolite synthesized by any process can be used with no limitation. Typical properties of zeolite Y used in this invention are the following:

| SiO$_2$/Al$_2$O$_3$ | 4.5–5.5 |
|---|---|
| Na$_2$O content | 12–14% (volatile free basis) |
| BET Surface Area | 400–800 m$^2$/g |
| Particle size | 1–10 μm |
| XRD pattern | typical of faujasite type structures. |

The Inventive Composition

We have found that by adjusting the relative amounts of a hydrous clay, a caustic leached calcined clay, and a porous mineral in a composition present in paper coatings to achieve substantially equivalent contact angles of each of the inks of an ink-jet printer with the surface of the coated paper, an excellent balance of color density and color definition are achieved.

As defined above, substantially equivalent contact angles refer to contact angles not deviating more than ±10, preferably not more than ±5, most preferably not more than ±3 degrees from the numeric average of the contact angles measured for the multicolored inks applied to a coated paper surface containing the inventive composition of this invention. Too much deviation in contact angle will impart either loss of density or excessive bleed. Additionally, it is desirable to control the value of the contact angle between 60° and 110°, preferably between 70° and 100° most preferably between 70° and 90°. Contact angles less than 70° will tend to have poorer image density. Contact angles greater than 100° will tend to have greater bleed. The intent is to have similar contact angle responses for all the inks to achieve excellent print density and definition. If any one or combination of the four inks respond to the coating outside these ranges, the performance will be impacted. It will either tend to have bleeding of colors generated with inks that respond with greater than 100° or poorer density of colors generated with less than 70°.

Other additives may be used with the compositions of this invention to provide coating compositions. Such additives include binders (adhesives), surfactants (dispersants), and viscosity stabilizers.

Desireably, suitable adhesives have the ability to adsorb dyes. Preferably such a dye-adsorbing adhesive is a polyelectrolyte having a dissociative group capable of bonding with a dissociative group of the dyes being used. The combination of a basic dye and an anionic or amphoteric polyelectrolyte, as well as the combination of a direct dye or an acid dye and a cationic or amphoteric polyelectrolyte, can be used.

Suitable examples of such dye-adsorbing adhesive include sodium polyacrylate, sodium salt of styrene-maleic anhydride copolymer, methyl vinyl ether-maleic anhydride copolymer, ethylene-maleic anhydride copolymer, polystyrene sulfonate salt, carboxymethyl cellulose, cellulose sulfate, carboxy modified polyvinyl alcohol, sodium alginate, gum arabic, emulsion of acrylic ester copolymer having an anionic dissociative group, polyvinyl benzyl trimethylammonium chloride, polydiallyl dimethylammonium chloride, polymethacryloyloxyethyl-beta-hydroxy ethyldimethylammonium chloride, hydrochloride of polydimethylaminoethyl methacrylate, polyethyleneimine, polyamide-polyamine resin, cationic starch, ethylated starch, gelatin, casein, soybean protein, acrylic acid-dimethylaminoethyl methacrylate copolymer, and an emulsion of acrylic ester copolymer having a cationic dissociative group.

When components other than the adhesive are being used to adsorb the dyes, adhesives having few or no dissociative groups may be employed. Thus, starch, polyvinyl alcohol, methyl cellulose, hydroxyethyl cellulose, hydroxyethylated starch, polyacrylamide, polyvinyl pyrrolidone, styrene-butadiene copolymer latex, methyl methacrylate-butadiene copolymer latex, and acrylic ester copolymer emulsion may be used under such circumstances. Alternatively, a dye-absorbing adhesive may be combined with an adhesive having no ability to adsorb dyes.

The binder is preferably present with the inventive composition (pigment) from about 20 to 40, more preferably from about 25 to 35 parts based on 100 parts of pigment.

The dye-adsorbing property of the layer of pigment can be conferred by incorporating in it a water-soluble barium salt (e.g., barium chloride), calcium salt, manganese salt or aluminum salt (e.g., aluminum chloride) which reacts with a direct dye or an acid dye in ink to form a lake, or by incorporating phosphorus tungsten molybdic acid, phosphorus tungstic acid, phosphorus molybdic acid, tannic acid, tartar emetic and aliphatic acid which reacts with a basic dye in ink to form a lake. The lake formation also has the effect of providing a colored image of improved light fastness and water resistance.

The layer of pigment is coated from a solution which may also contain a wetting agent or surfactant such as glycerin, polyethylene glycol or pyrrolidone (rendering the pigment layer highly wettable with respect to aqueous inks), a dye or pigment (for toning such as bluing), a fluorescent dye, a UV absorber, a pigment dispersant, defoaming agent, lubricant such as calcium stearate, mildew proofing agent, and an agent for making the adhesive water-resistant such as melamine resin, urea resin, polyamide-epichlorohydrin resin, formalin, glyoxal, epoxy compound, or zirconium compound.

Suitable dispersants include water soluble salts of a condensed phosphate, such as a pyrophosphate, e.g., tetrasodium pyrophosphate, (TSPP), a water soluble salt of a polysilicic acid, for example, sodium silicate, or a water soluble organic polymeric dispersing agent, for example a polyacrylate or a polymethacrylate salt having a molecular weight in the range of about 500 to about 10,000.

Typically the dispersant will be present in an amount of about 5 parts dispersant per 100 parts of pigment.

Other optional additives include a viscosity stabilizer (such as COLLOID 230 available from Rhone-Poulenc, Marietta, Ga. Ammonium hydroxide (such as Ammonium Hydroxide 26. Be available from any major chemical supplier), a (biocide) preservative (such as NALCO 7649 available from Nalco Chemical, Naperville, Ill.), a slurry defoamer (such as Dow "B" Emulsion available from Dow Corning of Midland, Mich.).

If the components mentioned above exhibit a tendency to agglomerate and not form a uniform pigment coating solution, a separate solution prepared from components other than the pigment and adhesive may be first applied to a support before it is coated with a solution containing the pigment and adhesive.

Suitable examples of the material that can be used as a support for the pigment coating are paper, cloth, plastic film, metal sheet, woodboard and glass sheet. A transparent or translucent support enables a colored image to be observed not only by reflected light but also by transmitted light. Paper used as the support in this invention is primarily made of wood pulp which may be mixed with synthetic fiber, synthetic pulp, or inorganic fiber. The paper may have incorporated therein: (1) a sizing agent such as rosin, alkyl ketone dimer or alkenyl succinic acid; (2) fillers such as, silica clay, talc or calcium carbonate; (3) paper strength modifiers such as polyacrylamide or starch; (4) fixing agents such as aluminum sulfate or cationic polyelectrolyte; (5) wet strength modifiers such as melamine resin, urea resin, or polyamide-polyamine-epichlorohydrin resin; (6) dyes, including fluorescent dyes. A size press may be used to apply a coating of a water-soluble adhesive such as starch, polyvinyl alcohol or gelatin.

The coating mixtures of the invention can be applied to the base paper sheet using coating equipment of the type generally used in the paper industry, such as a paper machine size press, or on machine and off machine coaters of various types and configurations. Examples of other suitable coaters include an air-knife coater, blade coater, bar coater, roll coater, gravure coater, curtain coater and metering size press. After a pigment coating solution is applied and dried, the coating surface may be rendered smooth on a machine calender, supercalender or gloss calender, as in the case of general purpose pigment-coated paper. Adjustments in final solids concentration and rheological properties may be required for different coater types. More specifically, the coating mixture can be applied using a flexographic coater consisting of an Anilox roll and a transfer roll to apply the coating to the paper surface, which can be provided with a backing roll opposing the transfer roll. The coated paper sheet can then be dried in any appropriate drying system, such as an air flotation dryer.

The coating weights in accordance with the invention are preferably about 4 to about 12, more preferably about 4 to about 6 g/m².

EXAMPLES

Preparative Examples

The following components were used to demonstrate the invention:

Hydrous Clay—Commercially available hydrous clay having a particle size distribution of 90 percent less than 0.5 micrometer and a median particle size distribution of approximately 65–70 percent at 0.2 micrometer.

Leached Calcined Clay—This component was made from a commercially available calcined clay sold under the tradename Ansilex 93® which was formed into a slurry of 30 percent solids and heated to 60° C. and maintained at 60° C. for one hour in a 15 percent caustic solution of 15 percent by weight (dry basis) of fully calcined clay.

Porous Mineral—This component was a synthetic Y type zeolite having a faujasite structure (by XRD analysis) and having the following characteristics:

$SiO_2/Al_2O_3$ Ratio: 4.5–5.5

$Na_2O$ Content: 12–14% (volatile free basis)

BET Surface Area: 400–800 $m^2/g$

Particle Size: 1–10 µm

Inventive Composition—Using the foregoing described components, to 100 grams of the caustic leached calcined clay is added 20 grams of the zeolite Y. Acid is added to adjust the pH to the range of 10.5 to 11.0. The composition is filtered to remove salts. To the filtered composition is added 20 grams of the hydrous clay slurry (50 percent solids) mixed and then spray-dried. The spray-dried product is pulverized to form particles of approximately 1 to 3 micrometers.

Illustrative Examples

The foregoing components and composition were separately made into four (4) coating compositions to demonstrate the invention. Coatings were made in a standard makedown system. That is, pigment was slurried and binder added at 40 parts per 100 parts pigment. The binder used was a combination of 70 weight % polyvinyl alcohol and 30 weight % ethylated starch (Penford Gum 280 available from Penick & Ford, Cedar Rapids, Iowa). Each of the coatings were applied to a base paper of 50# bond (available from Wausau/Otis) at a coating weight of between 4–5 g/m$^2$. The contact angles were by the method described in commonly assigned, co-pending patent application, U.S. Ser. No. 09/071,507, filed May 1, 1998 the disclosure of which is incorporated by reference and briefly described below.

The method involves measuring of the contact angle between each of the inks used with each coated paper. A one inch by one inch sample is cut from the coated paper. Each sample is then placed in a clip device to suspend the sample over the test fluid. The test fluid consist of a solution of paper dyes from Clariant Corporation. Brilliant Blue GNS Liquid is the cyan color, Red A4G New Liquid is the magenta color, Cartasol Yellow 3GF Liquid is the yellow color, and Ink Black RAS liquid purified 075 is the black color. All of these colors were made into test fluids by diluting 100 microliters of the individual colors (dyes) with a sufficient amount of deionized water to achieve a total test fluid volume of 40 milliliters. The resulting surface tensions of the test fluids were:

| Ink | Surface Tension (dynes/cm) |
|---|---|
| Cyan | 56.8 |
| Magenta | 61.6 |
| Yellow | 60.8 |
| Black | 63.7 |

The clipped sample is hung in the stirrup of the Dynamic Contact Angle Analyzer instrument (Cahn DCA 315). A beaker containing the test fluid is placed on the stage of the instrument directly below the test specimen. The beaker is elevated manually until the test fluid is in close proximity of the test specimen. The instrument program is run to raise (distance per unit time) the fluid to immerse the test specimen and subsequently remove the test specimen from the fluid. During immersion and removal of the test specimen from the fluid, the change in force is measured by the instrument. The change in force over a specified distance indicates the test specimens affinity or repulsion to the particular fluid. The program then measures the force during the retraction of the test specimen out of the fluid. All of the measurements are then calculated by the program to give a contact angle result for each color with respect to the coated sample tested.

The following contact angles were measured for the four coated samples.

Description of Color Density and Definition Ratings

The DOS based HP Deskjet printer Dietzgen test pattern generates areas for analysis for both color density and definition.

Color densities are measured with a COSAR 200 densitometer with a polarized filter. Five readings are taken for each color from the approximately 1"×1" color block generated by the printers. The readings are taken at four corners and the center of the color square, averaged and then recorded.

For color definition, the solid color blocks are used for all the primary and combination colors. Ratings are determined by "Good", "Slight", and "Moderate". The distinction for each relates to the color block edge sharpness, non-printed line sharpness (within the color blocks), in both horizontal and verticle directions. However, the test pattern has additional areas to determine black color definition. It has blocks for tone comparison. Black blocks of ¼, ½, and fill tone also indicate definition. The better the tone distinction the better the definition.

Finally, the area of the pattern for fine definition is such that eight lines are produced, both horizontally and vertically, from a common point. They separate approximately 1 degree from each other over a distance of 1.70 inches. Therefore, the closer to the focal point each line is identifiable, the better the definition. The ratings are comprised of each of these areas and given an overall definition rating.

The respective color densities and color definitions determined as outlined above for the various tested coated papers are listed below:

| Composition | Black | Yellow | Cyan | Magenta |
|---|---|---|---|---|
| COLOR DENSITY RESULTS | | | | |
| Hydrous Clay | 1.58 | 1.24 | 1.92 | 1.69 |
| Leached Calcined Clay | 1.90 | 0.97 | 1.76 | 1.49 |
| Zeolite Y | 1.93 | 1.16 | 1.91 | 1.70 |
| Inventive Composition | 1.65 | 1.26 | 2.48 | 1.94 |
| COLOR DEFINITION RESULTS | | | | |
| Hydrous Clay | Moderate | Good | Good | Slight |
| Leached Calcined Clay | Severe | Good | Good | Good |
| Zeolite Y | Good | Good | Slight | Slight |
| Inventive Composition | Good | Good | Good | Good |

Reviewing the foregoing Color Density results, one sees that the paper coated with a composition containing the Inventive Composition (pigment) achieves the highest color density for all colors except for Black. Additionally, the

| CONTACT ANGLE RESULTS (±Deviation)[1] | | | | | |
|---|---|---|---|---|---|
| Composition | Black | Yellow | Cyan | Magenta | AVG. |
| Hydrous Clay | 91.12(+2.61) | 94.12(+5.61) | 88.31(−0.2) | 80.47(−8.04) | 88.51 |
| Leached Calcined Clay | 50.38(+6.13) | 30.77(−13.48) | 33.60(−10.65) | 62.24(+17.99) | 44.25 |
| Zeolite Y | 99.46(−3.34) | 95.68(−7.12) | 103.96(−11.16) | 112.10(+9.3) | 102.8 |
| Inventive Composition | 88.13(+2.27) | 84.51(−1.35) | 82.85(−3.01) | 87.96(+2.1) | 85.86 |

[1]Deviation = measured contact angle - AVG.

Reviewing the Contact Angle results, one sees that the smallest deviations in contact angles were achieved by the coated paper containing the Inventive Composition. How these results relate to analysis of HP Deskjet test patterns relating to color density and color density follows.

invention also provide the best Color Definition results compared with the results from the other coated papers.

A further example was completed to compare the rheological properties of the Inventive Composition with that of a conventional, silica-based, inkjet paper coating pigment (Opticil-3186 available from Huber Corporation). The comparative rheological properties of the Inventive Composition and the silica in terms of the percent solids each pigment was able to be made down to and Brookfield viscosity (measured with a #2 spindle at 100 rpm and the corresponding % solids for each pigment as shown in FIG. 1) are depicted in FIG. 1.

Referring to FIG. 1, one sees that the Inventive Composition (depicted as Experimental) is capable of having approximately 65% higher solids than the silica pigment (33% solids for the Experimental vs. 20% solids for the silica). Also, the Experimental composition has superior Brookfield viscosity (≈330 cp) versus the silica (≈450 cp) or in other words, the silica has approximately a 36% higher Brookfield viscosity than the Experimental. Clearly, the Inventive Composition characteristic of this invention has superior rheological properties compared with conventional silica pigments.

The principles, preferred embodiments, and modes of operating of this invention have been described in the foregoing specification. However, the invention which is intended to be protected herein is not continued to be limited to the particular forms disclosed, since they are to be regarded as illustrative rather than restrictive. Variations and changes may be made by those skilled in the art without departing from the spirit of the invention.

What is claimed is:

1. A coating pigment composition comprising a mixture formed from:
    (a) a hydrous clay;
    (b) a caustic leached calcined clay; and
    (c) a porous mineral having a pore size of up to 100 Angstroms and a BET surface area in the range of 200 to 1000 $m^2/g$;
wherein (a), (b), and (c) are present in relative amounts such that said pigment composition present in a coating produces substantially equivalent ink contact angles when said coating receives more than one type of colored ink.

2. The composition of claim 1, wherein the contact angles of each type of colored ink is within ±10 degrees of each other from the numeric average of the measured contact angles.

3. The composition of claim 2, wherein the value of each of the contact angles ranges from 60 to 110 degrees.

4. The composition of claim 3, wherein the value of each of the contact angles ranges from 70 to 100 degrees.

5. The composition of claim 4, wherein the value of each of the contact angles ranges from 70 to 90 degrees.

6. The composition of claim 1, wherein the hydrous clay has a particle size distribution of 90.0 percent finer than 0.5 micrometer.

7. The composition of claim 6, wherein the hydrous clay has a particle size distribution of 98 percent finer than 0.5 micrometer.

8. The composition of claim 1, wherein the caustic leached calcined clay is derived from a calcined clay having a degree of silica leaching no greater than about 40 percent by weight of the silica in the calcined clay.

9. The composition of claim 8, wherein the degree of silica leaching is no greater than about 20 percent.

10. The composition of claim 1, wherein the mineral is selected from the group consisting of zeolites, porous silica, alumina, calcium carbonate, montmorillonite, attapulgite, halloysite, vermiculite, diatomaceous earth, silicic anhydride, talc, aluminum silicate, calcium silicate, magnesium silicate, barium sulfate, calcium sulfate, zinc oxide, and zirconia salt.

11. The composition of claim 10, wherein the mineral is a synthetic zeolite.

12. The composition of claim 11, wherein the zeolite is of the Beta, Y, or L type.

13. The composition of claim 12, wherein the zeolite is Y type.

14. The composition of claim 13, wherein the zeolite is a sodium, Y type zeolite.

15. The composition of claim 6, wherein the caustic leached calcined clay is derived from a calcined clay having a degree of silica leaching no greater than 25 percent by weight of the silica in the calcined clay, and the zeolite is a synthetic Y-type zeolite.

16. The composition of claim 7, wherein the caustic leached calcined clay is derived from a calcined clay having a degree of silica leaching no greater than about 20 percent by weight of the silica in the calcined clay, and the zeolite is a synthetic, sodium Y-type zeolite.

17. A coating pigment composition comprising a mixture formed from:
    (a) from 15 to 20 percent by weight of a hydrous clay;
    (b) from 60 to 70 percent by weight of a caustic leached calcined clay; and
    (c) from 15 to 20 percent by weight of a zeolite.

18. The composition of claim 15, wherein the hydrous clay has a particle size distribution of 90.0 percent finer than 0.5 micrometer, the caustic leached calcined clay being derived from a calcined clay having a degree of silica leaching no greater than about 25 percent by weight of the silica in the calcined clay, and a synthetic Y zeolite.

19. The composition of claim 16, wherein the hydrous clay has a particle size distribution of 90 percent finer than 0.5 micrometer, the caustic leached calcined clay being derived from a calcined clay having a degree of silica leaching no greater than about 20 percent by weight of silica in the calcined clay, and a sodium synthetic Y zeolite.

20. The composition of claim 10, wherein the porous silica is selected from the group consisting of fumed silica, precipitated silica, silica aerogels and silica hydrogels, and the montmorillonite is selected from the group consisting of bentonite and hectorite.

* * * * *